Aug. 28, 1951     T. B. KEESLING     2,566,211
DRIVE ATTACHMENT FOR TOOLS
Filed Aug. 26, 1949

INVENTOR.
THOMAS B. KEESLING
BY
ATTORNEYS

Patented Aug. 28, 1951

2,566,211

UNITED STATES PATENT OFFICE 2,566,211

DRIVE ATTACHMENT FOR TOOLS

Thomas B. Keesling, San Jose, Calif., assignor of one-half to C. H. Keesling, San Jose, Calif.

Application August 26, 1949, Serial No. 112,444

1 Claim. (Cl. 74—801)

The present invention relates to attachments for drilling machines of the type employing differential gearing for transmitting a drive at reduced speed so that drills or other tools of larger size than the normal capacity of the drilling machine would be employed.

The invention has for its object, among others, the provision of an attachment of above character of a simplified, compact, and economical design, which can be easily assembled and which will provide a long operating life.

The above and other objects of the invention will be apparent from the following description of a preferred embodiment thereof as illustrated in the accompanying drawings in which.

Figure 1:
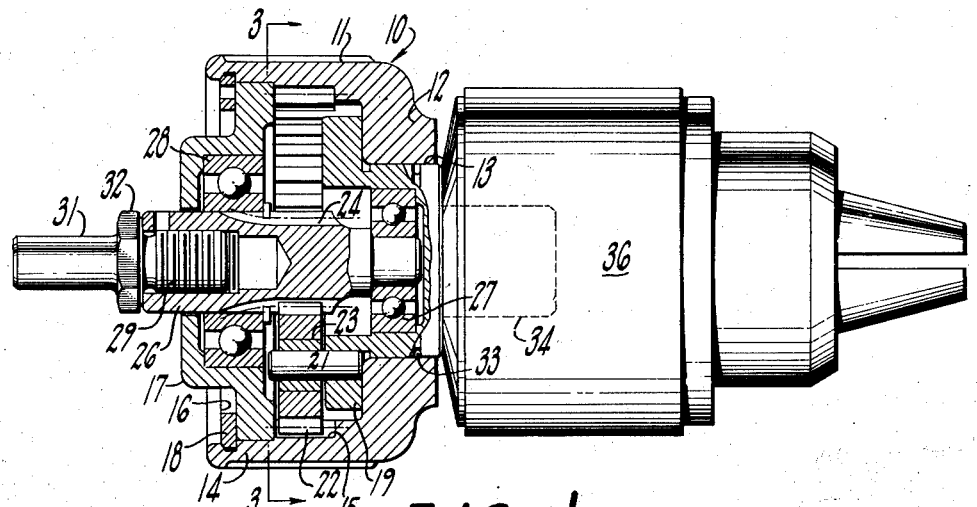
Figure 1 is a transverse sectional view of a drilling attachment embodying the invention with the chuck employed therewith shown in elevation.
Figure 2:
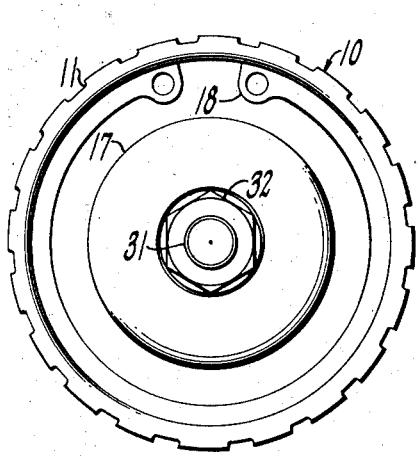
Figure 2 is an end elevational view showing attachment as viewed from the left of Figure 1.

Referring to the drawings, the drilling attachment includes a diecast body or housing member 10 of generally cylindrical shape and having outer serrations 11 formed thereon as a hand grip as referred to in greater detail hereinafter. The body 10 is provided at one end with a boss or hub 12 of reduced diameter within which there is journalled a cylindrical portion of a driven member or spider member 13 described in greater detail hereinafter. Adjacent its open end at the left of Figure 1, the body 10 is provided with an annular portion 14 of greater diameter having diecast teeth 15 formed thereon in spaced relation from an annular groove 16. The teeth 15 provide a shoulder for seating of or abutment by a cover and bearing housing member 17 which is held in place within the body by means of a conventional wedge-type retaining ring 18, marketed under the trade name of "Truarc."

Figure 3:
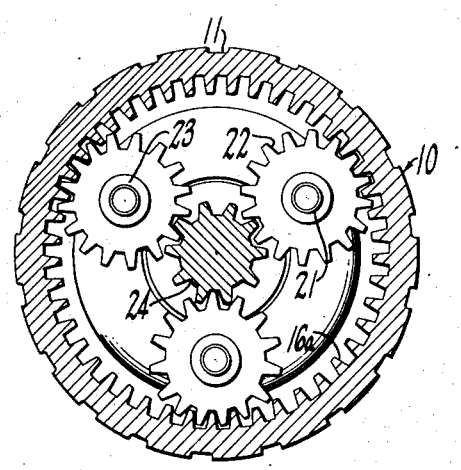
Figure 3 is a vertical sectional view taken as indicated by the line 3—3 in Figure 1.
Figure 4:
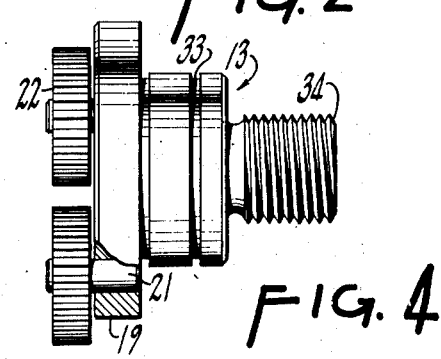
Figure 4 is an elevational view of the driven member of the attachment with a portion of the view shown in section.

As previously explained the drill attachment incorporates differential gearing in which the body 10 has the internal ring gear 15 formed therein while the spider or driven member 13 is provided with an annular flange 19 for seating against an end face of the boss 12 and for carrying the planet pinion shafts 21 of the differential gearing having planet pinions or gears 22 journalled thereon by means of respective bushings 23. As seen in Figure 3, there are 3 planet gears 22 which mesh with a sun gear 24 formed integrally on an input shaft 26. The shaft 26 has its inner reduced end journalled by bearing 27 within the hub portion of the spider member 13. Adjacent its other end the shaft 26 is journalled by means of a bearing 28 within the cover or bearing retainer 17. The shaft 26 is internally threaded to receive the threaded end 29 of a chucking shaft 31 having a nut portion 32 formed thereon.

Referring in detail to the driven member or spider 13, its central cylindrical portion is grooved at 33 and has integrally formed therewith a reduced threaded shaft portion 34 for attachment thereto of conventional chuck 36.

The above described parts cooperate in their interrelation with each other and as parts of a spur gear type differential to enable the compact size and economical construction provided in applicant's drive attachment. Note that the output member or spider 13 is journalled within the boss 12 and about the bearing 27 which are in radial alignment with each other so that the planet pinions 22 are supported in outboard fashion with respect to the bearing support for the spider itself. These planet pinions 22 in their relation to the ring gear 15 and the sun gear 24 in effect providing an outboard bearing for the output member 13 to stabilize it, irrespective of loose journalling of the spider in the boss 12. Because of this outboard support of the planet pinions they are free to seek their own orbit of rotation and attain a stabilized relation with respect to load distribution. In this way, the load is carried equally by these planet pinions and is distributed equally between three teeth of the ring gear 15 and three teeth of the sun gear 24. This distribution of load enables a small diameter sun gear 24 and facilitates the use of diecast teeth 15, as well as enabling a small width of the bearing 27 and the bearing surface of boss 12. The uniform load distribution between the three equally spaced apart teeth of the sun gear 24 also exerts a stabilizing influence on the input shaft 26.

The arrangement of parts also is simplified by the overlapping relation of the spider 13 to the boss 12 to prevent endwise float of the spider assembly in one direction and through the bearing 27, the input shaft 26, and the bearing 28 to prevent float in the other direction.

In operation, the chuck shaft 31 is secured in the chuck of the drilling machine, or, with the chuck of the drilling machine removed, the input shaft 26 can be threaded directly on the output shaft of the drill. The tool to be used is secured in the chuck 36 and when a drive is desired to be transmitted thereto the body 10 is grasped in the hand of the operator. At any time that the load becomes too great, the operator merely has to release the body 10 which then starts to rotate so that a drive is no longer transmitted to the tool.

While I have shown a preferred embodiment of the invention it will be understood that the invention is capable of variation and modification from the form shown so that its scope should be limited only by the scope of the claims appended hereto.

I claim:

A drive attachment for drilling machines and the like comprising a body having a cylindrical wall of a size to be manually gripped, said body at one end extending inwardly from said wall to provide a boss having an interior surface perpendicular to the axis of the body, said boss having a central opening therethrough of less size than the opening at the other end of said body, said wall on its interior having gear teeth parallel to said axis and terminating short of the larger opening of the body, an output member applicable through the said larger opening having a hollow portion occupying and journalled in said opening of the boss, said hollow portion at its outer end having a wall integral therewith to close the same and provide means to carry a chuck, the output member at its inner end having an outwardly extending annular flange overlapping and contacting said interior surface, a removable cover for the larger opening of the body insertable therethrough and surrounded by the cylindrical wall, said cover abutting the adjacent ends of said gear teeth, means engaging the cylindrical wall to secure the cover in the aforesaid position, bearing devices carried centrally within said hollow portion and said cover, an input shaft applicable through said larger opening journalled in said bearing devices and provided with gear teeth, said input shaft extending outwardly centrally through the said cover, and planetary gearing in said body carried by said flange and enmeshed with said gear teeth of said wall and said input shaft.

THOMAS B. KEESLING.

REFERENCES CITED

The following references are of record in the file of this patent:

UNITED STATES PATENTS

| Number | Name | Date |
|---|---|---|
| 1,721,612 | Yannes | July 23, 1929 |
| 1,975,984 | Stoll | Oct. 9, 1934 |
| 2,085,322 | Lapsley | June 29, 1937 |
| 2,198,921 | Shaff | Apr. 30, 1940 |
| 2,199,505 | McGrath | May 7, 1940 |